(12) United States Patent
Weber et al.

(10) Patent No.: US 8,235,410 B2
(45) Date of Patent: Aug. 7, 2012

(54) TRAILER AND TOWING RELATED TECHNOLOGIES

(76) Inventors: Richard Weber, Whitewater, CO (US); Linda Weber, Whitewater, CO (US)

( * ) Notice: Subject to any disclaimer, the term of this patent is extended or adjusted under 35 U.S.C. 154(b) by 4 days.

(21) Appl. No.: 13/028,046

(22) Filed: Feb. 15, 2011

(65) Prior Publication Data
US 2011/0198826 A1    Aug. 18, 2011

Related U.S. Application Data

(60) Provisional application No. 61/304,753, filed on Feb. 15, 2010.

(51) Int. Cl.
*B60D 1/58* (2006.01)
(52) U.S. Cl. .......................... 280/457; 280/482; 280/495
(58) Field of Classification Search .................. 280/495, 280/457, 462, 480, 480.1, 482, 501; D12/162, D12/101, 106, 193
See application file for complete search history.

(56) References Cited

U.S. PATENT DOCUMENTS

| | | |
|---|---|---|
| 831,956 A | 12/1906 | Jonas |
| 839,518 A | 12/1906 | Shaw |
| 929,920 A | 8/1909 | Davis |
| 1,065,989 A | 7/1913 | Verbeke |
| 1,131,018 A | 3/1915 | Troutman |
| 1,235,082 A | 7/1917 | Brethorst |
| 1,304,276 A | 5/1919 | Haeseleer |
| 1,314,982 A | 9/1919 | Reed |
| 1,326,551 A | 12/1919 | Turnbull |
| 1,350,962 A | 8/1920 | Flory |
| 1,391,760 A | 9/1921 | Collier |
| 1,424,631 A | 8/1922 | Edmonds |
| 1,433,922 A | 10/1922 | Williams |
| 1,450,526 A | 4/1923 | Timmis |
| 1,479,182 A | 1/1924 | Jeschke |
| 1,550,502 A * | 8/1925 | Chamberlain ................ 280/467 |
| 1,665,133 A | 4/1928 | Gibson |
| 1,768,304 A | 6/1930 | Ayler |
| 2,050,093 A | 8/1936 | Goldman |
| 1,091,668 A | 8/1937 | Bradford |
| 2,089,400 A | 8/1937 | Morris |
| 2,104,734 A | 1/1938 | Carpenter |

(Continued)

FOREIGN PATENT DOCUMENTS

WO    2005095130 A1    10/2005

OTHER PUBLICATIONS

International Preliminary Examination Report for PCT/US04/07747, the parent international application for this application dated Oct. 19, 2006.

(Continued)

*Primary Examiner* — Anne Marie M Boehler
(74) *Attorney, Agent, or Firm* — Santangelo Law Offices, P.C.

(57) ABSTRACT

The inventive technology, in embodiments, may be described as an extended trailer hitch receiver tube support apparatus that uses triangulation of key structural components to provide a hitch of comparatively higher strength. Tensionable receiver tube supporters may be used to achieve a triangular lattice support; a vertical member established above a cross member may provide a forward attachment site for the tensionable receiver tube supporters, thereby allowing the transfer of forces from the extended receiver tube to the vertical member, and then back to the vehicle frame (or frame attached component) via tensionable vertical member supporters.

28 Claims, 16 Drawing Sheets

U.S. PATENT DOCUMENTS

| | | |
|---|---|---|
| 2,150,269 A | 3/1939 | Dreisbach |
| 2,160,350 A * | 5/1939 | Bechman .................. 280/497 |
| 2,287,234 A | 6/1942 | Ducharme |
| 2,386,195 A | 10/1945 | Clark |
| 2,444,876 A | 7/1948 | Kuhl |
| 2,451,660 A | 10/1948 | Clark et al. |
| 2,463,926 A | 3/1949 | Ward |
| 2,468,579 A | 4/1949 | Vuori |
| 2,472,514 A | 6/1949 | Brinkley |
| 2,475,443 A | 7/1949 | Bill |
| 2,523,211 A | 9/1950 | Hedgpeth |
| 2,531,289 A | 11/1950 | Murat |
| 2,546,531 A | 3/1951 | Vutz |
| 2,638,315 A | 5/1953 | Wagner |
| 2,663,574 A | 12/1953 | Martin |
| 2,687,899 A | 8/1954 | Bendtsen |
| 2,708,045 A | 5/1955 | Shontz |
| 2,712,452 A | 7/1955 | Hallowell |
| 2,736,575 A | 2/1956 | Gebhart |
| 2,783,039 A | 2/1957 | Wilson |
| 2,786,690 A | 3/1957 | Tharp |
| 2,864,627 A | 12/1958 | Kleinknecht |
| 2,917,323 A | 12/1959 | Mandekic |
| 2,919,142 A | 12/1959 | Winget |
| 2,947,551 A | 8/1960 | Reimers |
| 2,984,011 A | 5/1961 | Hamilton |
| 2,992,832 A | 7/1961 | Robinson |
| 3,084,953 A | 4/1963 | McGregor |
| 3,099,462 A | 7/1963 | Lent |
| 3,118,688 A | 1/1964 | Stilley |
| 3,126,210 A | 3/1964 | Hill |
| 3,150,884 A | 9/1964 | Drott |
| 3,159,368 A | 12/1964 | Ahlbin et al. |
| 3,169,028 A | 2/1965 | Scrivner |
| 3,181,891 A | 5/1965 | Moats |
| 3,201,144 A | 8/1965 | Smyser |
| 3,266,818 A | 8/1966 | Hill et al. |
| 3,281,161 A | 10/1966 | Anderson |
| 3,311,390 A | 3/1967 | Rendessy |
| 3,319,977 A | 5/1967 | Quandt et al. |
| 3,329,402 A | 7/1967 | Grumman |
| 3,400,948 A | 9/1968 | Matson |
| 3,439,764 A | 4/1969 | Kimball |
| 3,462,173 A * | 8/1969 | Bock ............................. 280/484 |
| 3,482,847 A | 12/1969 | Hart |
| 3,549,173 A | 12/1970 | Stanfield |
| 3,576,225 A | 4/1971 | Chambers |
| 3,578,358 A | 5/1971 | Reynolds |
| 3,596,925 A | 8/1971 | Richie |
| 3,622,182 A | 11/1971 | Grosse-Rhode |
| 3,659,876 A | 5/1972 | Melton |
| 3,715,132 A | 2/1973 | Denny |
| 3,718,317 A | 2/1973 | Hilmer |
| 3,738,672 A | 6/1973 | Dalton |
| 3,740,077 A | 6/1973 | Williams |
| 3,740,078 A | 6/1973 | Murr |
| 3,765,703 A | 10/1973 | Voelkerding et al. |
| 3,767,230 A | 10/1973 | DeVries |
| 3,768,837 A | 10/1973 | Reese |
| 3,774,149 A | 11/1973 | Bennett |
| 3,782,760 A | 1/1974 | Mann |
| 3,807,767 A | 4/1974 | Moline |
| 3,818,599 A | 6/1974 | Tague |
| 3,823,962 A | 7/1974 | Martin, Jr. |
| 3,825,921 A | 7/1974 | Marus et al. |
| 3,837,675 A | 9/1974 | Barnes et al. |
| 3,858,966 A | 1/1975 | Lowell, Jr. |
| 3,860,267 A | 1/1975 | Lyons |
| 3,889,384 A | 6/1975 | White |
| 3,893,713 A | 7/1975 | Ivy |
| 3,904,225 A | 9/1975 | George et al. |
| 3,912,119 A | 10/1975 | Hill et al. |
| 3,918,746 A | 11/1975 | Lehtisaari |
| 3,922,007 A | 11/1975 | Friedebach |
| 3,938,122 A | 2/1976 | Mangus |
| 3,989,270 A | 11/1976 | Henderson |
| 4,029,335 A | 6/1977 | Cady et al. |
| 4,046,398 A * | 9/1977 | Dunwoody ................. 280/415.1 |
| 4,047,734 A | 9/1977 | Miles |
| 4,054,302 A | 10/1977 | Campbell |
| 4,060,255 A | 11/1977 | Zimmerman |
| 4,065,147 A | 12/1977 | Ross |
| 4,073,508 A | 2/1978 | George et al. |
| 4,082,311 A | 4/1978 | Hamman |
| 4,125,272 A | 11/1978 | Putnam, Jr. et al. |
| 4,159,833 A | 7/1979 | Meiners |
| 4,168,082 A | 9/1979 | Hendrickson |
| 4,168,847 A | 9/1979 | Westphal |
| 4,169,610 A | 10/1979 | Paufler |
| 4,173,353 A | 11/1979 | Steele |
| 4,176,853 A | 12/1979 | Brock |
| 4,176,854 A | 12/1979 | Hill et al. |
| 4,183,548 A | 1/1980 | Schneckloth |
| 4,186,939 A | 2/1980 | Woods et al. |
| 4,187,494 A | 2/1980 | Jessee |
| 4,192,524 A * | 3/1980 | Twiestmeyer ............... 280/416.1 |
| 4,202,562 A | 5/1980 | Sorenson |
| 4,205,453 A | 6/1980 | Steele |
| 4,215,875 A | 8/1980 | Younger |
| 4,254,968 A | 3/1981 | DelVecchio |
| 4,254,969 A | 3/1981 | Martin |
| 4,283,073 A | 8/1981 | Gostomski et al. |
| 4,285,138 A | 8/1981 | Berry |
| 4,313,264 A | 2/1982 | Miller, Sr. |
| 4,320,907 A | 3/1982 | Eaton |
| 4,374,593 A | 2/1983 | Smith et al. |
| 4,398,744 A | 8/1983 | Schoppel et al. |
| 4,428,596 A | 1/1984 | Bell et al. |
| 4,431,208 A | 2/1984 | Geeves |
| 4,472,100 A | 9/1984 | Wagner |
| 4,509,769 A | 4/1985 | Weber |
| 4,511,159 A | 4/1985 | Younger |
| 4,537,416 A | 8/1985 | Linaburg |
| 4,564,209 A | 1/1986 | Kingsley et al. |
| 4,583,481 A | 4/1986 | Garrison |
| 4,621,432 A | 11/1986 | Law |
| 4,666,176 A | 5/1987 | Sand |
| 4,669,748 A | 6/1987 | LeVee |
| 4,708,359 A | 11/1987 | Davenport |
| 4,773,667 A | 9/1988 | Elkins |
| 4,774,823 A | 10/1988 | Callison |
| 4,792,151 A | 12/1988 | Feld |
| 4,799,705 A | 1/1989 | Janes et al. |
| 4,854,604 A | 8/1989 | Stallsworth |
| 4,856,200 A | 8/1989 | Riggs |
| 4,856,804 A | 8/1989 | Nash |
| 4,884,496 A | 12/1989 | Donavich |
| 4,893,829 A | 1/1990 | Davis |
| 4,903,978 A | 2/1990 | Schrum, III |
| 4,905,376 A | 3/1990 | Neeley |
| 4,911,460 A | 3/1990 | DePaula |
| D311,511 S | 10/1990 | Craig |
| 4,961,589 A | 10/1990 | Faurenhoff |
| 4,961,590 A | 10/1990 | Davenport |
| 4,991,865 A | 2/1991 | Francisco |
| 5,005,852 A | 4/1991 | Smyly, Sr. |
| 5,009,444 A | 4/1991 | Williams, Jr. |
| 5,009,445 A | 4/1991 | Williams, Jr. |
| 5,016,900 A | 5/1991 | McCully |
| 5,035,441 A | 7/1991 | Murray |
| 5,036,593 A | 8/1991 | Collier |
| 5,080,386 A | 1/1992 | Lazar |
| 5,085,408 A | 2/1992 | Norton et al. |
| 5,108,123 A | 4/1992 | Rubenzik |
| 5,113,588 A | 5/1992 | Walston |
| 5,114,170 A | 5/1992 | Lanni et al. |
| 5,125,679 A | 6/1992 | Delano |
| 5,143,393 A | 9/1992 | Meyer |
| 5,150,911 A | 9/1992 | Williams |
| 5,184,839 A | 2/1993 | Guedry |
| 5,195,769 A | 3/1993 | Williams, Jr. |
| 5,224,270 A | 7/1993 | Burrus |
| 5,236,215 A | 8/1993 | Wylie |
| 5,269,554 A | 12/1993 | Law et al. |
| 5,277,446 A | 1/1994 | Hamel |
| D344,485 S | 2/1994 | Linne et al. |
| 5,282,515 A | 2/1994 | Bell |

| | | |
|---|---|---|
| 5,286,050 A | 2/1994 | Stallings, Jr. et al. |
| 5,288,095 A | 2/1994 | Swindall |
| 5,288,096 A | 2/1994 | Degelman |
| 5,309,289 A | 5/1994 | Johnson |
| 5,314,202 A | 5/1994 | Wilkins, Jr. |
| 5,328,199 A | 7/1994 | Howe |
| 5,335,930 A | 8/1994 | Tighe |
| 5,338,047 A | 8/1994 | Knisley |
| 5,340,143 A | 8/1994 | Williams, Jr. |
| 5,348,329 A | 9/1994 | Morin et al. |
| 5,405,160 A | 4/1995 | Weaver |
| 5,449,191 A | 9/1995 | Cattau |
| 5,465,992 A | 11/1995 | Anderson |
| 5,478,101 A | 12/1995 | Roberson |
| 5,482,309 A | 1/1996 | Hollis |
| 5,482,310 A | 1/1996 | Staggs |
| 5,503,422 A | 4/1996 | Austin |
| 5,509,682 A | 4/1996 | Lindenman et al. |
| 5,513,870 A | 5/1996 | Hickman |
| 5,516,137 A | 5/1996 | Kass et al. |
| 5,516,139 A | 5/1996 | Woods |
| 5,529,329 A | 6/1996 | McCoy |
| 5,529,330 A | 6/1996 | Roman |
| 5,558,352 A | 9/1996 | Mills |
| 5,580,076 A | 12/1996 | DeRoule et al. |
| 5,580,088 A | 12/1996 | Griffith |
| 5,650,764 A | 7/1997 | McCullough |
| 5,657,175 A | 8/1997 | Brewington |
| 5,669,621 A | 9/1997 | Lockwood |
| 5,678,839 A | 10/1997 | Pobud, Jr. et al. |
| 5,680,706 A | 10/1997 | Talcott |
| 5,690,348 A | 11/1997 | Williams, Jr. |
| 5,697,630 A | 12/1997 | Thompson et al. |
| 5,707,070 A | 1/1998 | Lindenman et al. |
| 5,725,231 A | 3/1998 | Buie |
| 5,758,893 A | 6/1998 | Schultz |
| 5,769,443 A | 6/1998 | Muzny |
| 5,779,256 A | 7/1998 | Vass |
| 5,785,330 A | 7/1998 | Shoquist |
| 5,797,616 A | 8/1998 | Clement |
| 5,806,196 A | 9/1998 | Gibbs et al. |
| 5,806,872 A | 9/1998 | Szczypski |
| 5,821,852 A | 10/1998 | Fairchild |
| 5,839,745 A | 11/1998 | Cattau et al. |
| 5,882,027 A | 3/1999 | Tevis |
| 5,882,029 A | 3/1999 | Kennedy |
| 5,887,884 A | 3/1999 | Smith |
| 5,893,575 A | 4/1999 | Larkin |
| 5,909,892 A | 6/1999 | Richardson |
| 5,924,716 A | 7/1999 | Burkhart, Sr. et al. |
| 5,927,229 A | 7/1999 | Karr, Jr. |
| 5,927,742 A | 7/1999 | Draper |
| 5,951,035 A | 9/1999 | Phillips, Jr. et al. |
| 5,970,619 A | 10/1999 | Wells |
| 5,975,552 A | 11/1999 | Slaton |
| 5,979,927 A | 11/1999 | Hale |
| 6,010,142 A | 1/2000 | McCoy et al. |
| 6,042,136 A | 3/2000 | Heinecke |
| 6,076,847 A | 6/2000 | Thornton |
| 6,086,083 A | 7/2000 | Wilks |
| 6,089,590 A | 7/2000 | Bowers |
| 6,102,422 A | 8/2000 | Damron |
| 6,179,318 B1 | 1/2001 | Howard |
| 6,182,997 B1 | 2/2001 | Ullrich et al. |
| 6,193,258 B1 | 2/2001 | Kennedy |
| 6,250,650 B1 | 6/2001 | Douglas |
| 6,259,357 B1 | 7/2001 | Heider |
| 6,312,004 B1 | 11/2001 | Kiss |
| 6,318,747 B1 | 11/2001 | Ratican |
| 6,341,794 B1 | 1/2002 | Hunter |
| 6,348,112 B1 | 2/2002 | Hildreth et al. |
| 6,357,126 B1 | 3/2002 | Gillen, Jr. |
| 6,357,777 B1 | 3/2002 | Linger et al. |
| 6,443,474 B1 | 9/2002 | Kay |
| 6,585,280 B1 | 7/2003 | Wiers |
| 6,634,666 B2 | 10/2003 | Shilitz et al. |
| 7,118,053 B2 * | 10/2006 | Truan et al. .................. 239/661 |
| 7,651,114 B2 | 1/2010 | Weber et al. |
| 7,815,210 B1 | 10/2010 | Pennal |
| 8,038,186 B2 * | 10/2011 | Roth ............................. 293/117 |
| 2002/0185838 A1 | 12/2002 | Shilitz et al. |
| 2003/0222427 A1 * | 12/2003 | Wolters et al. ................ 280/495 |
| 2008/0054598 A1 | 3/2008 | Weber et al. |

OTHER PUBLICATIONS

US National Phase U.S. Appl. No. 10/592,662, filed Sep. 11, 2006.
http://www.reesehitchestogo.com/trailer_hitch;Reese Hitches Fitment Guide; Reese Trailer Hitch and Wiring Fitment Guide; 2 pages.
http://www.reesehitchestogo.com; Reese Hitches, Fifth Wheels and Trailer Hitch Accessories; 2 pages.
U.S. Appl. No. 61/304,753, filed Feb. 15, 2010 (Weber et al.).
U.S. Appl. No. 12/693,343, filed Jan. 25, 2010 (Weber et al.).

* cited by examiner

TRAILER AND TOWING RELATED TECHNOLOGIES

This non-provisional patent application claims benefit of and priority to provisional application No. 61/304,753, filed Feb. 15, 2010, said provisional application incorporated herein by reference in its entirety.

TECHNICAL FIELD

The present invention is directed to the field of vehicle towing technology, and especially relates to vehicle/truck receiver hitch technology, such as for towing implements, trailers, vehicles, or the like, or indeed meeting any towing requirements.

BACKGROUND

Traditional towing technologies have incorporated various types of coupling devices, which may traditionally be referred to as a hitch, or hitches, for the coupling of a trailer to a source of towing power. Hitches may generally be considered implements in a broad field potentially including a coupling portion associated with a source of towing power and a coupling portion associated with the trailer to be towed. A hitch configuration may generally be considered as having portions that are associated with the "tow-side" and portions that are associated with a "towed-side". The implements that are usually associated with the "tow-side" are generally known as "receiver hitches"; these are fixedly attached to the tow vehicle and accept "towed-side" hitch implements such as a "ball mount" (that slides into the "receiver hitch" and accepts the "tow ball"). Other examples include pintle hook type, or tow bar and pin, among other implements. The implements that are generally used on the "towed-side" are tow ball couplers, pintle rings, and tow bars with bar slots for attachment to the "tow vehicle", among others.

Hitch technology can include various hitch configurations, and may include bumper pull or tongue configurations, pintle configurations, farm implement type configurations, as well as other hitch configurations. The hitch may have one or more couple portions such as one or more receivers, inserts, pins, balls, rings, hooks, bars, tubes, bumpers, plates plugs, tongues, chains, plain or threaded rods, turnbuckles, chain links, devises, or other such couplings.

Receiver hitches use plates that are attached to the bottom or side of vehicle frames and usually have a cross member between the two frame plates of box tube or round pipe that is unsupported in the middle. This cross tube or pipe carries the pull load from the towed implement and must be sized to accept a maximum deflection from this force. This cross tube must also carry the towed implements "tongue load" that is applied to the hitch cross tube as mostly downward and some upward "torque" of this weight. All of the pull weight, braking weight, downward torque, and upward torque, from these pressures are transferred to the hitch side plates, and then onto the bottom or sides of the vehicle or implement frame members.

In order to hitch a trailer, or other such towed implement, to a truck or other vehicle with a large extended load out to the rear, such as a load of material, or slide in truck camper, or commercial box type unit that extends out to the rear, or other such type load or part of a vehicle that extends out beyond the rear of the truck or vehicle, the hitch receiver (at the end of a receiver tube) located at the rear of the truck or vehicle must be extended out past the load being carried with an extended hitch tube that moves the ball mount or other type of connection, in a rearwards direction for various distances. The truck or vehicle load carrying area could be a truck pick-up bed, a truck flatbed, or a truck or vehicle chassis-cab type with an extended box, a farm implement, military, or other type configuration.

There are various styles of extended hitch tubes, either in single or double configurations, for use in trailer or implement hook-up to a truck or vehicle when the truck or vehicle has an extended load or appurtenance out past the truck or vehicle receiver.

This varying length extended hitch tube, in essence, extends the reach and placement of the ball mount and trailer ball, or other type connection, to the rear past the extended load as detailed above so that the trailer, vehicle, implement, or other towed appliance may be hitched to the truck or vehicle. As can be appreciated, such extension magnifies forces applied by the towed-side load to the tow-side hitch apparatus, and to the vehicle frame at points of connection.

The double style extended receiver hitch tube configuration, although having a high weight carrying capacity, comes with a cost—a cumbersome and quite heavy implement to handle and install, attached lateral chain assemblies that return back to the sides of the truck receiver hitch and attach on a level plain, a lowered second or lower tube of the double tube, resulting in a lowered clearance distance that may cause contact with the underlying surface when driving over rough terrain or into and out of fuel stations, etc. Further, the appearance is also affected by the bulky look, and the attachment systems of chains and turnbuckles are cumbersome and slow to perform.

The single tube style systems do not have the problems as detailed above but do not have the weight carrying capacity and strength that the above style has, nor can they carry the appropriate loads that are required in many cases. It seems one has the choice of a light and convenient system that will not carry the loads that are required or one that does carry the load has the many downsides as detailed above.

Most, if not all of the current style of receiver hitches rely solely on the carrying capacity of the cross tube as the loads are transferred to the receiver hitch side plates, which are then attached to the bottom or sides of the vehicle or implement frame members.

In all the foregoing, the conventional technologies can suffer from various drawbacks, as mentioned. Particular embodiments of the inventive technology seek to resolve one or more of the above mentioned concerns.

DESCRIPTION OF PREFERRED EMBODIMENTS

Figure 1:
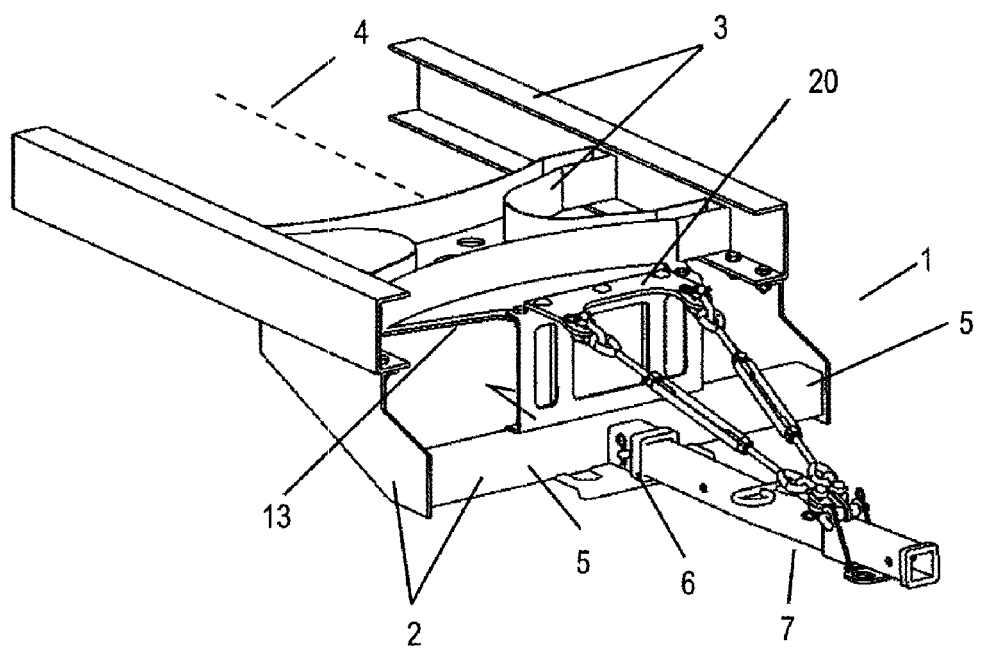
FIG. 1 shows an embodiment of the inventive technology.
Figure 2:
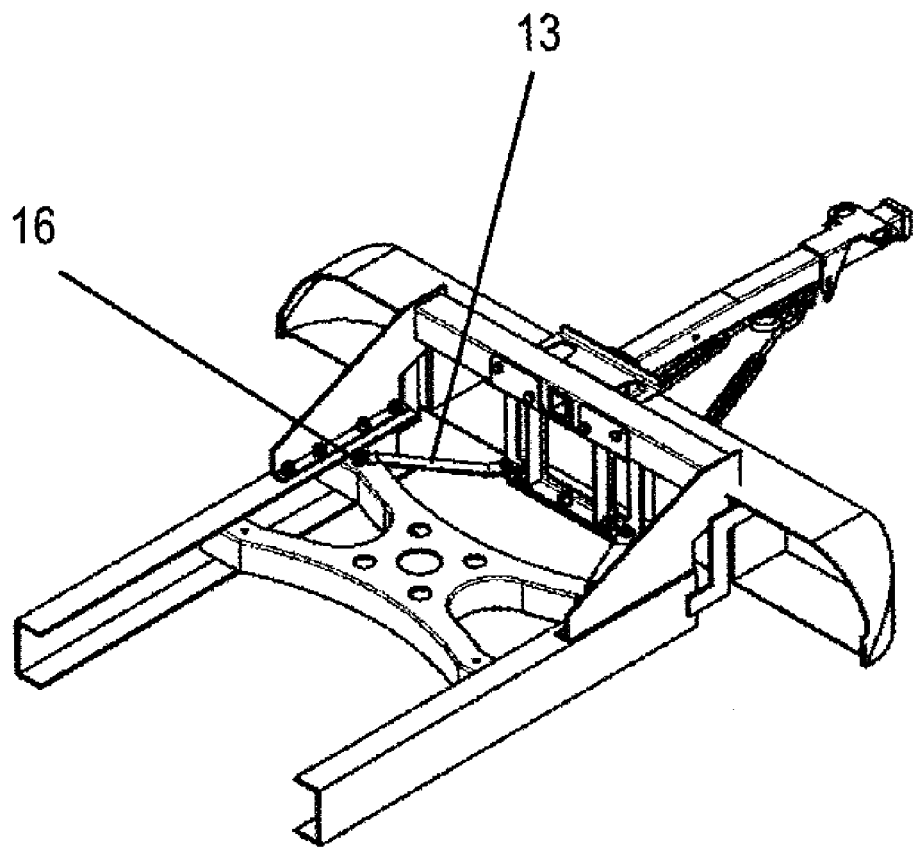
FIG. 2 shows an embodiment of the inventive technology.
Figure 3:
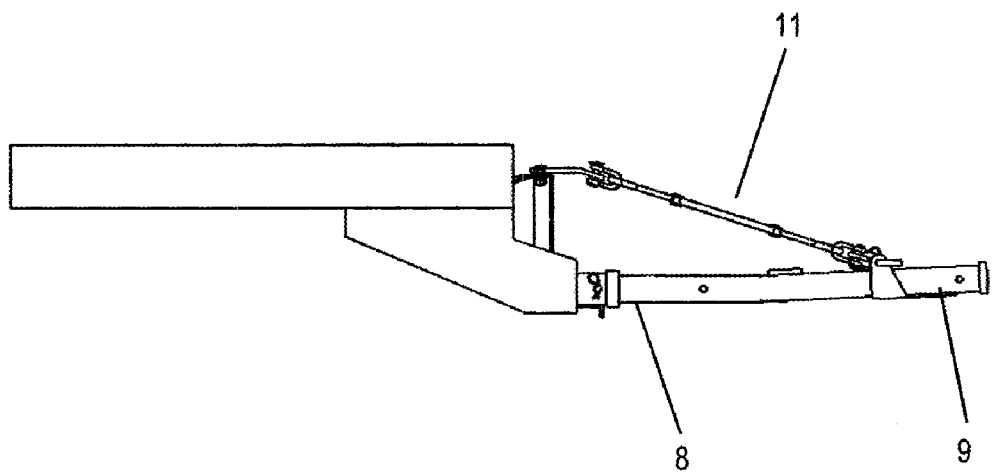
FIG. 3 shows an embodiment of the inventive technology.
Figure 4:
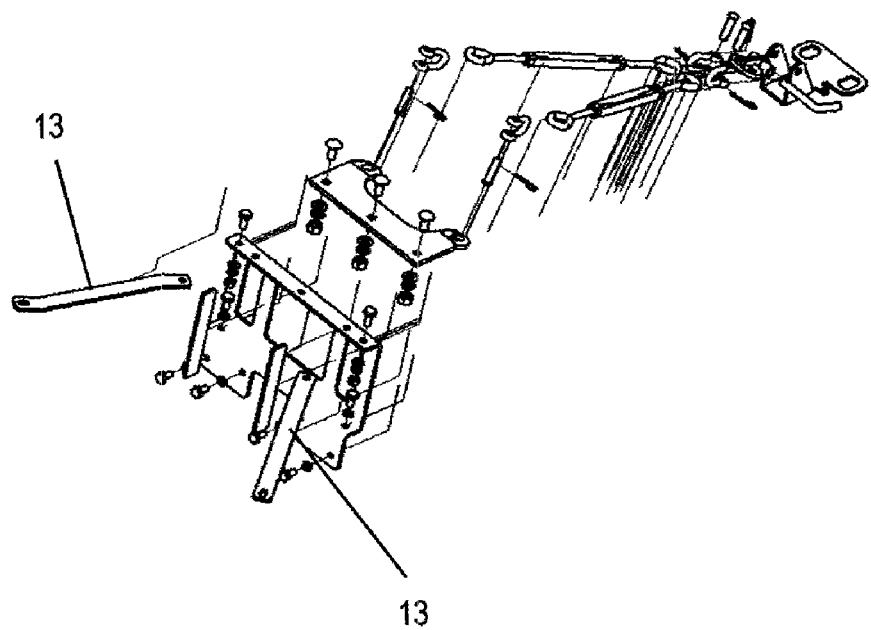
FIG. 4 shows an exploded view of an embodiment of the inventive technology.
Figure 5:
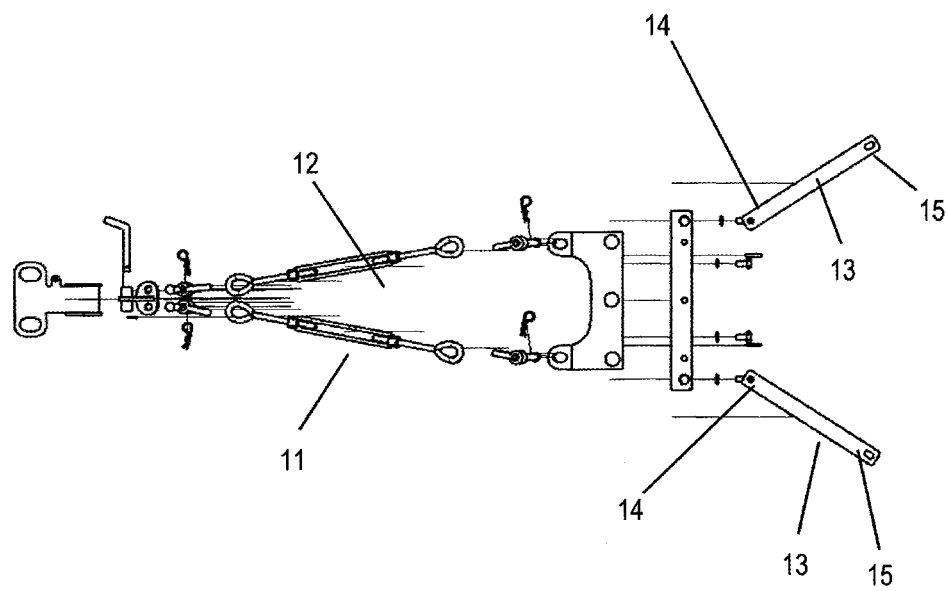
FIG. 5 shows an exploded view of an embodiment of the inventive technology.
Figure 6:
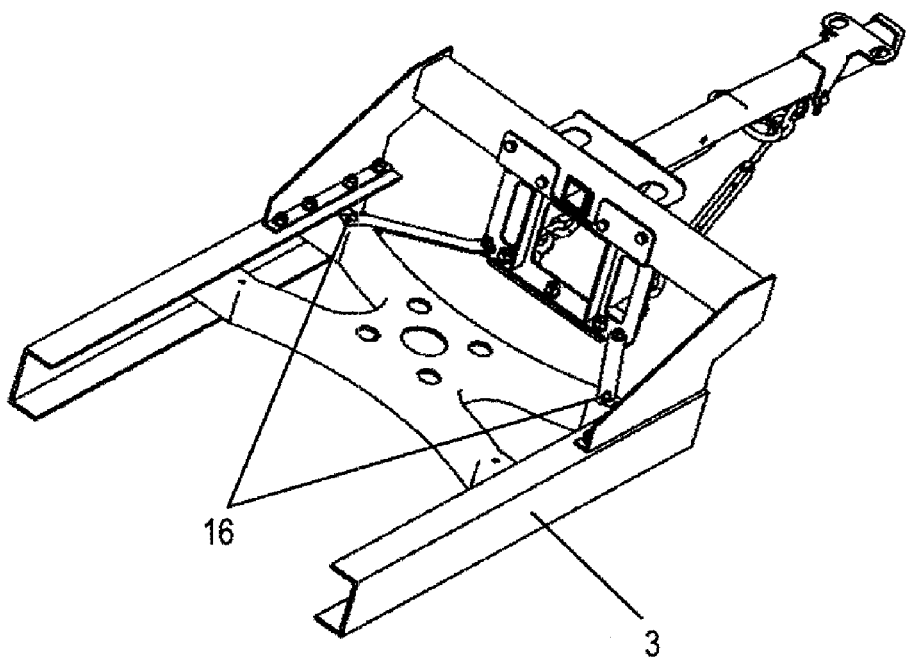
FIG. 6 shows an embodiment of the inventive technology.
Figure 7:
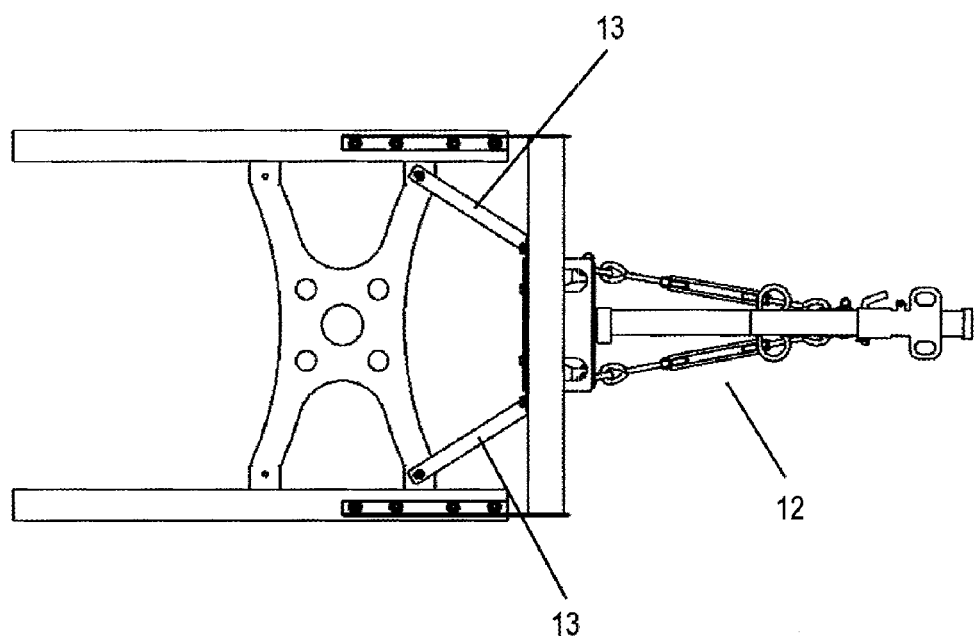
FIG. 7 shows an embodiment of the inventive technology.
Figure 8:
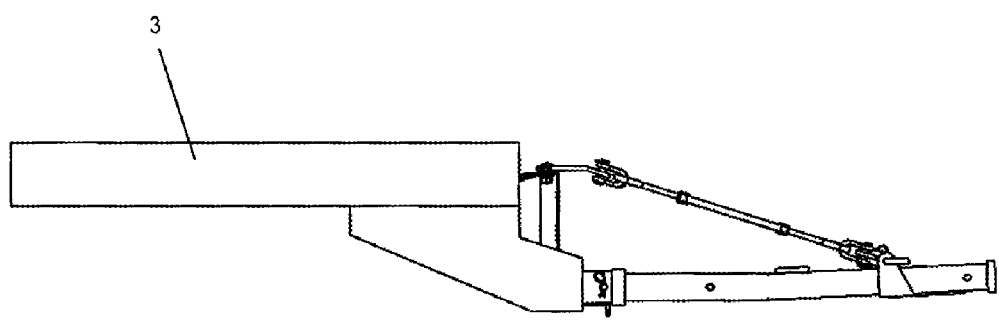
FIG. 8 shows an embodiment of the inventive technology.
Figure 9:
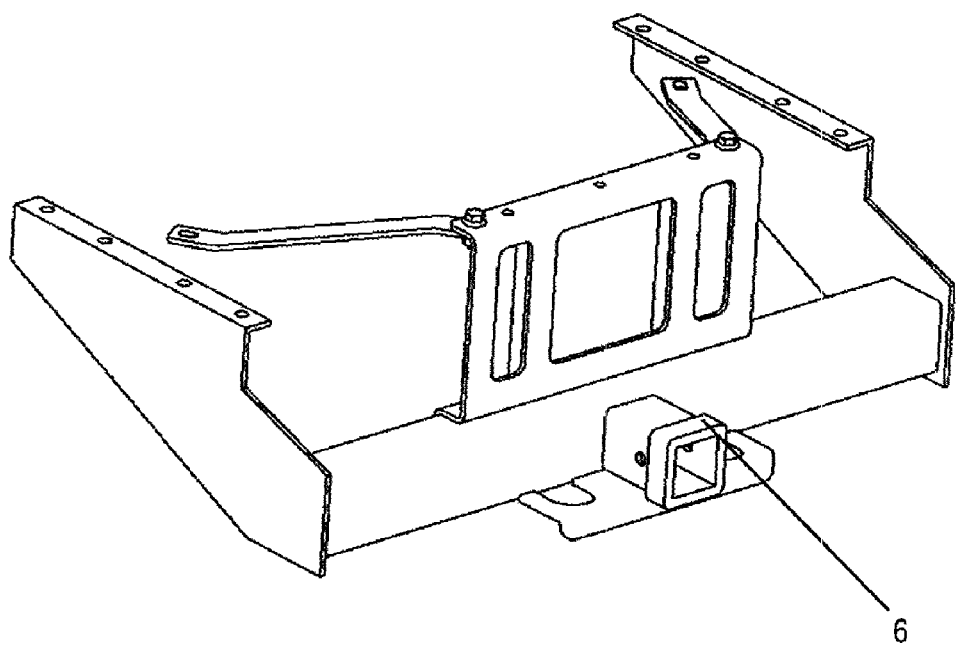
FIG. 9 shows an embodiment of the inventive technology.
Figure 10:
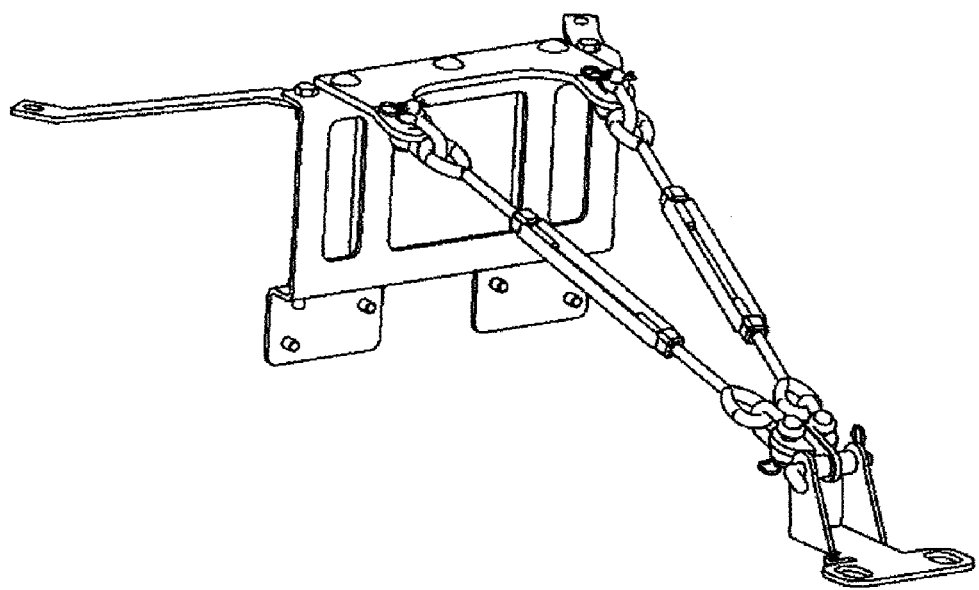
FIG. 10 shows an embodiment of the inventive technology.
Figure 11:
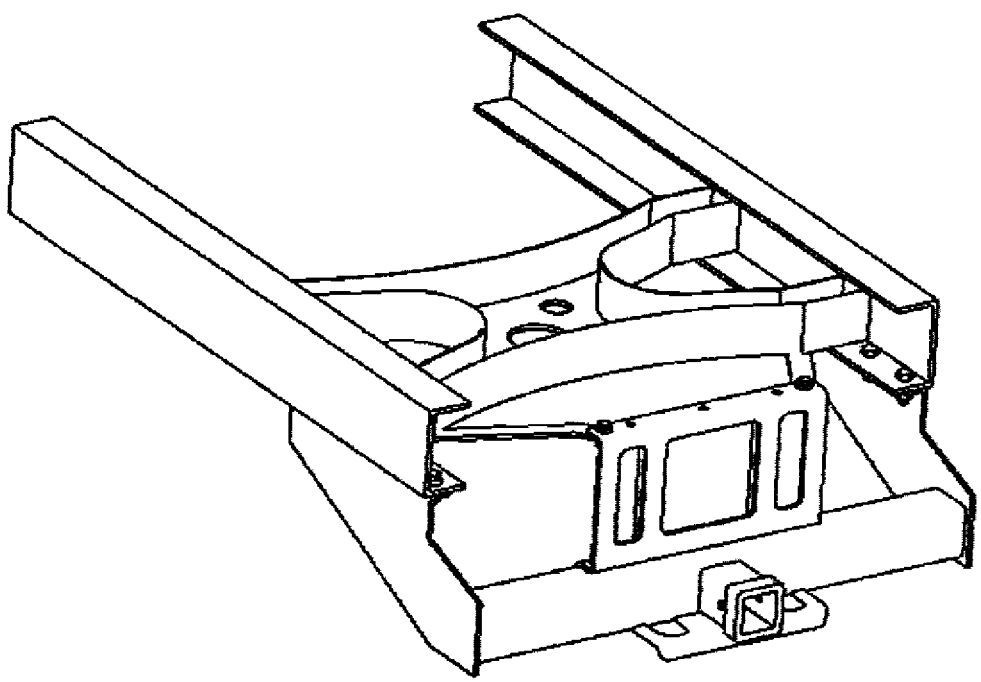
FIG. 11 shows an embodiment of the inventive technology.
Figure 12:
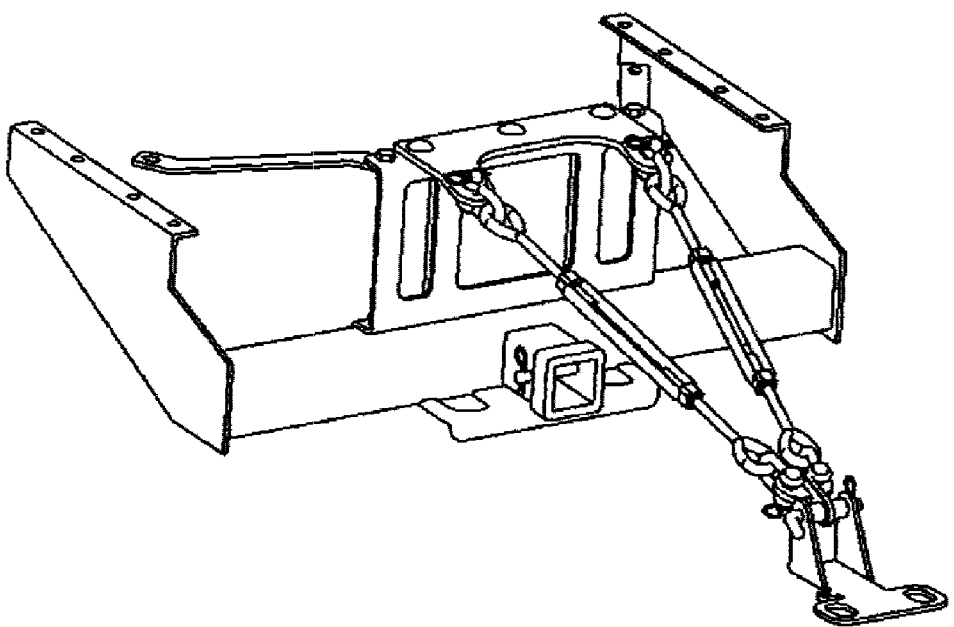
FIG. 12 shows an embodiment of the inventive technology.
Figure 13:
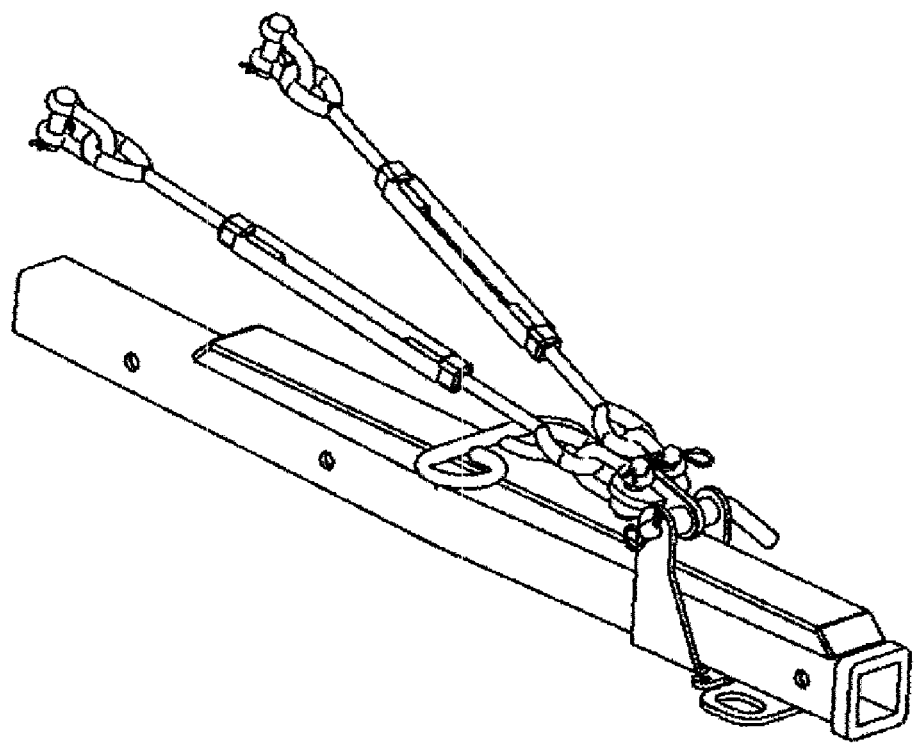
FIG. 13 shows an embodiment of the inventive technology.
Figure 14:
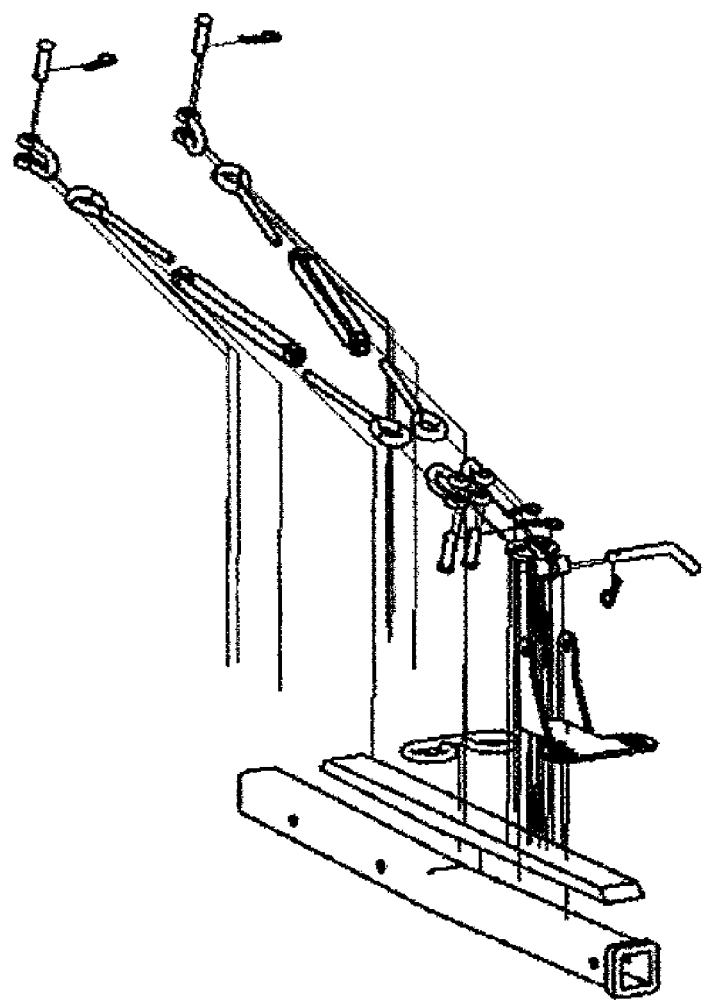
FIG. 14 shows an exploded view of an embodiment of the inventive technology.
Figure 15:
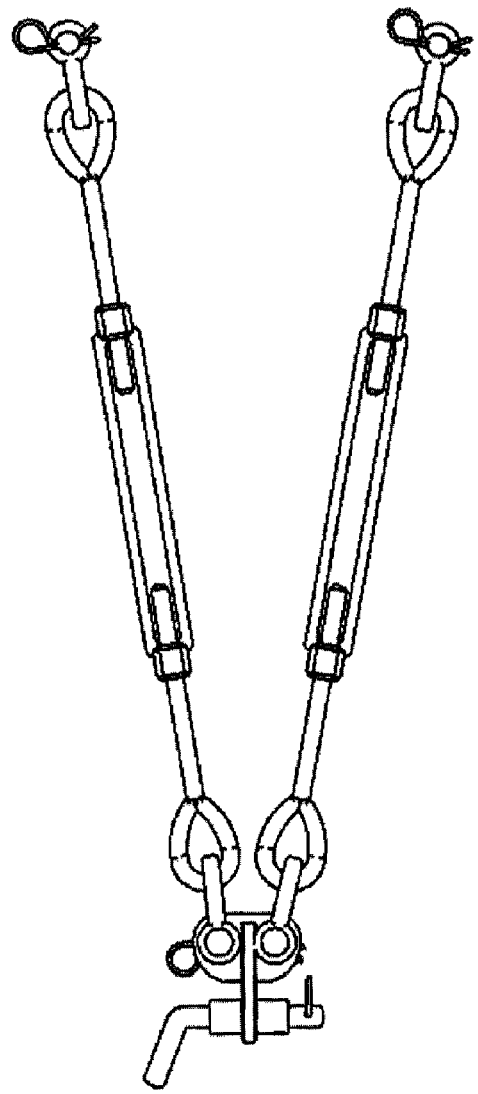
FIG. 15 shows an embodiment of the inventive technology.
Figure 16:
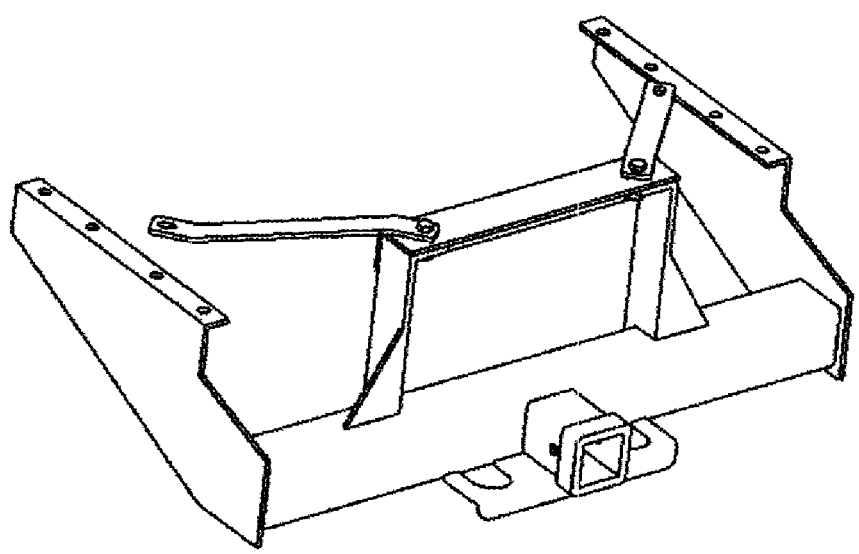
FIG. 16 shows an embodiment of the inventive technology.

As mentioned earlier, the present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

At least one embodiment of the inventive apparatus may be described as an extended trailer hitch receiver tube support apparatus (1) that comprises: a frame attached, extended hitch tube receiver support (2) attached to a vehicle frame (3), the vehicle frame defining a longitudinal, vehicle frame centerline (4) (typically coinciding with a straight direction of travel of the vehicle), the frame attached, extended hitch tube receiver support comprising a hitch receiver support cross member (5) that traverses substantially along a width of the vehicle (of course, the width perpendicular to the aforementioned longitudinal vehicle frame centerline) and transversely to the longitudinal, vehicle frame centerline.

The apparatus may further comprise: a hitch tube receiver (6) (e.g., for receiving an extended hitch tube (7)) connected with the hitch receiver support cross member (e.g., via welding, as but one example), an extended hitch receiver tube (7) (at the rearward end of which a ball may be mounted for attachment of a trailer) having a front end (8) and rear end (9) (where front and rear, and forward and rearward are with respect to a vehicle travel direction), and operatively engaged with the hitch tube receiver (in conventional, known manner, so as to provide a secure attachment during use of the apparatus) at the front end; a vertical member (10) connected with the hitch receiver support cross member (whether via bolts or otherwise) and having at least a portion above the hitch tube receiver; and tensionable receiver tube supporters (11), each of which: has two ends; and connects at one of the ends (e.g., forward end) to the vertical member, and at another of the ends (e.g., rearward end) to the extended hitch receiver tube at a site other than the front end of the extended hitch receiver tube (e.g., perhaps in the middle, or toward the rear end, as but two examples). The rear connection of the tensionable receiver tube supporters may be via sleeve, clamshell, weld, pin and hole, as but a few examples. The tensionable receiver tube supporters may together form a triangulating support lattice (12) (particularly when viewed from above). It is also of note that the term "extended" as modifying hitch receiver tube merely means that the receiver tube, when operatively engaged with the hitch tube receiver, extends out from the receiver. It is also of note that the extended hitch receiver tube may be support enhanced or buttressed by additional tube(s) or bars aligned therewith.

The apparatus may further comprise: tensionable vertical member supporters (13), each of which: has two ends; connects at one of the ends (e.g., a rearward end (14)) to the vertical member and at another of the ends (e.g., a forward end (15)) to an apparatus tie-in site (16), the apparatus tie-in site comprising a site selected from the group consisting of: the vehicle frame, and the frame attached, extended hitch tube receiver support. Note that even indirect connection is connection.

The tensionable vertical member supporters (13) may, and in a preferred embodiment do, extend diagonally forward from the vertical member. Further, the tensionable receiver tube supporters (11) may extend diagonally forward and/or extend upwards from the site at which the tensionable receiver tube supporters connect with the extended hitch receiver tube. When both the tensionable receiver tube supporters (11) and the tensionable vertical member supporters (13) both diagonally extend forward from their rear most connection points, a particularly strong lattice framework transfers forces in a manner that adequately counters all, or the vast majority of, forces anticipated during towing.

In at least one embodiment, the apparatus tie-in is the vehicle frame; in another, it may be the frame attached, extended hitch tube receiver support. Preferably, but not necessarily, the tensionable receiver tube supporters comprise turnbuckles, but they may also, or instead, comprise chains (as but one other example). Turnbuckles, of course, offer advantages relative to facility of setup and assurance of load security. It is of note that the tensionable receiver tube supporters may connect to the extended hitch receiver tube via a quick connector (e.g., a rod with a pin through a swivel point, where pin removal allows for disconnection). It is of note that the term tensionable, as used herein, indicates an ability to resist a tension force (chain, turnbuckles, metal straps, etc.).

It is of note that the vertical member (10) may be established substantially behind a license plate connection site of the vehicle, and perhaps between the bumper and the spare tire. The tensionable vertical member supporters may comprise metal straps and/or chains, as but a few examples. Material established between what would otherwise be two discrete tensionable vertical member supporters does not render them as one; in such a case, the connected outer portions of such a webbed design would be the two tensionable vertical member supporters.

In preferred embodiments, the frame attached, extended hitch tube receiver support comprises only one cross member (5). Further, the vertical member may comprise a top connecting member (20) to which an end of each of the tensionable receiver tube supporters may be attached (whether removably so or not). Preferably, the apparatus is fully detachable from the vehicle frame; of course, nut and bolt connections, or other known methods that provide a secure connection, may be used. It is also of note that where part or component A is attached to part or component B, intervening material (as would be seen in an indirect connection), parts or components does not render part or component A as detached or disconnected from part or component B.

An extended trailer hitch receiver tube support method may comprise the steps of: attaching an extended hitch tube receiver support (2) to a vehicle frame (3), the vehicle frame defining a longitudinal, vehicle frame centerline (4), the extended hitch tube receiver support comprising a hitch receiver support cross member (5) that traverses substantially along a width of the vehicle and transversely to the longitudinal, vehicle frame centerline; connecting a hitch tube receiver (6) with the hitch receiver support cross member, operatively engaging (i.e., via a secure connection) an extended hitch receiver tube (7) having a front end (8) and rear end (9) with the hitch tube receiver at the front end; connecting a vertical member (10) with the hitch receiver support cross member such that at least a portion of the vertical member is above the hitch tube receiver; establishing a triangulating support lattice (12) by connecting tensionable receiver tube supporters to the vertical member and the extended hitch receiver tube at a site other than the front end of the extended hitch receiver tube; connecting tensionable vertical member supporters to the vertical member and to an apparatus tie-in site (16), the apparatus tie-in site comprising a site selected from the group consisting of: the vehicle frame, and the frame attached, extended hitch tube receiver support.

The present invention can be configured in many different embodiments to provide systems through which the challenges mentioned can be overcome. The present invention has advantages over each current standard receiver hitch technology where the trailer or implement load is carried (trailer or implement gross vehicle weight and the tongue load) at the immediate rear of the vehicle (usual bumper location) and "extended receiver tube" type applications where the trailer or implement must be towed from further back beyond an extended load or appurtenance (where the extended receiver tube allows for this extended reach).

Some of the present invention embodiments "triangulate" the varying stress loads on a receiver hitch from the cross member up to the frame along with the usual transfer of these loads to the receiver hitch side plates attached to the bottom or sides of the vehicle or implement frame members. This "triangulation" allows the cross tube to share its load in all of the various discussed manners, directly to the vehicle frame.

In certain embodiments, where an "extended hitch tube" is utilized, the extra leverage that is applied to the receiver hitch by the extended tube can be "triangulated" back to the vehicle frame directly and not only by the transfer of the pressures to the hitch side plates to the frame members. This "triangulation" allows for much higher "extension tube" carrying capacities and also eliminates the need for the double tube type extension tubes (or increases their strength where they still are used). This system, in embodiments, is not unlike the "suspension bridge" type of technology where a fixed end carries an extended load out to a point by varying means of attachments.

The inventive technology addresses inadequacies in many of the variety of previously identified conventional technologies. Accordingly, the present invention, in some initial embodiments, may address the problem of installation weight of the extended receiver hitch tube, the lengthy and cumbersome attachment systems, the lessoning of the carrying capacity, the low ground clearance, and other inherent problems, as detailed. Also, the discussed "triangulation" will allow for higher carrying capacities of receiver hitches and/or the use of smaller cross tube members if desired for varying reasons such as weight, appearance, or varying body styles of vehicles or implements.

In summary, the invention, in particular embodiments, involves an embodiment that strengthens the receiver hitch. Truck and vehicle receivers often have a square tubular steel insert that accepts the ball mount and coupler ball. This square tubular steel insert is welded to another square tubular steel cross member (or cross pipe in some applications) that attaches at the end to steel plate members that bolt to the truck or vehicle frame. All pull or brake weight stress applied to the cross tube and the torque that is produced by the downward push of the ball mount and ball by the coupler of the towed trailer or implement is transferred to this square tubular steel cross member; and must be sized to accept this torque. The invention, as described herein, in certain embodiments will transfer much of this torque to the truck or vehicle frame by a vertical member such as a steel plate member that is welded, bolted, or otherwise fixedly fastened to this square tubular steel support cross member. The vertical member (e.g., steel plate or plates, in many configurations) may rise up from the hitch receiver support cross member (e.g., steel tubing) to approximately the level of the truck or vehicle frame bottom, thus allowing additional structural members (e.g., tensionable vertical member supporters) to support this steel plate directly back to the truck or vehicle frame, transferring much of this torque through a "triangulation" of steel structural members of varying sizes and types.

Also, the invention, in some embodiments, involves single vertical point, or combined vertical and lateral connection point, hitch receiver extension tube, vehicle frame tie in, suspension support systems. These "suspension support" systems allow the extended ball mount or other type of connection pull and brake loads along with the torque stresses of upward and downward tongue loads, to be "triangulated" back to the vehicle frame via a system of attachments to the top of the vertical member by, e.g., a connection plate, thus allowing these load pressures to be passed back to the vehicle frame members.

When the receiver is to be used with a receiver extension as discussed earlier, there may be a steel plate that attaches to the top of the vertical member rising up from the cross member. This steel plate may transfer the torque from the end of the extended hitch tube by a "quick release" mechanism that, when in place, transfers the torque at the end of the receiver extension both vertically and laterally, up to the vertical member (perhaps connecting to a steel plate, e.g.) by various attachment systems, such as chains, devises, turnbuckles, and the like, thus transferring the entire torque back to the truck or vehicle frame as described above. The triangulating support system as described may start at a centralized point on a fixture that is fixedly attached to the extended hitch tube, and moves up and out, rearwards, at the same time to a higher and wider connection location point at the rear of the truck or vehicle steel plate that then attaches to the truck or vehicle frame. The site along the extended hitch tube at which the tensionable receiver tube supporters connect may be substantially at the middle of the extended hitch tube, or at a different site (but not at the end of the tube that inserts into the receiver that is attached to the hitch receiver support cross member. In certain embodiments, such connection site may be achieved via a component that slips over the rearward end of the extended tube. On a single vertical system, there is only one connection attachment system that attaches to a site on the receiver extension tube, and then back up to a connection point at the vertical member.

At least one embodiment does not use the receiver hitch cross tube enhancement system back to the vehicle frame but instead uses another system altogether. This system also transfers the towed load back to the vehicle frame but in such system the load is connected to the end (including towards the end thereof) of the extension tube by a single attachment system that connects to an eye bolt or other type of connection, and tied to a vehicle body frame member, such that the pull and torque loads are then triangulated back to the vehicle frame through an assortment of varying methods. Indeed, in certain embodiments there may be only one tensionable receiver tube supporters.

There are embodiments to the receiver extensions that are considered to be "quick connect" systems. These systems are designed to allow quicker hook up of the entire receiver extension systems. These systems are accomplished by varying means of connections utilizing standard connection features such as chains, clevises, turnbuckles, binders, quick links, rods, bars, and the like, along with newly designed features as "quick hookup and release" systems and parts. These can be single plates or a variety of plates, pipes, pins, rods, couplings, and the like.

Another embodiment is the design of a "strong back" to a known technology of receiver extension that allows for a much higher carrying capacity. There is another embodiment to a double style receiver extension tube system where the receiver extension has a main extension tube and a short tube; both are supported by a double receiver tube connection, but only the top extension is full length. These are support enhancements. This embodiment allows the use of a much lighter extension with full weight carrying capacity with the use of the receiver extension suspension support system.

The inventive technology, in embodiments, may be described as a frame support system for vehicle receiver hitches, as a stand-alone receiver hitch frame support, and/or optional, single vertical or combined vertical and lateral, receiver hitch extension tube frame tie in suspension system.

Of course, the figures filed herewith show only possible embodiments of the inventive technology, and are not intended to limit the scope of the inventive technology in any fashion.

As can be easily understood from the foregoing, the basic concepts of the present invention may be embodied in a variety of ways. It involves both hitching techniques as well as devices to accomplish the appropriate hitching. In this application, the hitching techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this patent application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "hitch" should be understood to encompass disclosure of the act of "hitching"—whether explicitly discussed or not—and, conversely, were there effectively disclosure of the act of "hitching", such a disclosure should be understood to encompass disclosure of a "hitch" and even a "means for hitching" Such changes and alternative terms are to be understood to be explicitly included in the description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Provisional Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the hitch devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group*, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 715 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The invention claimed is:

1. An extended trailer hitch receiver tube support apparatus, comprising:
    a frame attached, extended hitch tube receiver support attached to a vehicle frame, said vehicle frame defining a longitudinal, vehicle frame centerline, said frame attached, extended hitch tube receiver support comprising a hitch receiver support cross member that traverses substantially along a width of said vehicle and transversely to said longitudinal, vehicle frame centerline;
    a hitch tube receiver connected with said hitch receiver support cross member,
    an extended hitch receiver tube having a front end and rear end, and operatively engaged with said hitch tube receiver at said front end;
    a vertical member connected with said hitch receiver support cross member and having at least a portion above said hitch tube receiver;
    tensionable receiver tube supporters, each of which:
        has two ends; and
        connects at one of said ends to said vertical member, and at another of said ends to said extended hitch receiver tube at a site other than said front end of said extended hitch receiver tube,
    wherein said tensionable receiver tube supporters together form a triangulating support lattice,
    said apparatus further comprising:
        tensionable vertical member supporters, each of which:
            has two ends;
            connects at one of said ends to said vertical member and at another of said ends to an apparatus tie-in site, said apparatus tie-in site comprising a site selected from the group consisting of: said vehicle frame, and said frame attached, extended hitch tube receiver support.

2. An extended trailer hitch receiver tube support apparatus as described in claim 1 wherein said tensionable vertical member supporters extend diagonally forward from said vertical member.

3. An extended trailer hitch receiver tube support apparatus as described in claim 1 wherein said tensionable receiver tube supporters extend diagonally forward from said site at which said tensionable receiver tube supporters connect with said extended hitch receiver tube.

4. An extended trailer hitch receiver tube support apparatus as described in claim 1 wherein said tensionable receiver tube supporters extend upwards from said site at which said tensionable receiver tube supporters connect with said extended hitch receiver tube.

5. An extended trailer hitch receiver tube support apparatus as described in claim 1 wherein said apparatus tie-in is said vehicle frame.

6. An extended trailer hitch receiver tube support apparatus as described in claim 1 wherein said apparatus tie-in is said frame attached, extended hitch tube receiver support.

7. An extended trailer hitch receiver tube support apparatus as described in claim 1 wherein said tensionable receiver tube supporters comprise turnbuckles.

8. An extended trailer hitch receiver tube support apparatus as described in claim 1 wherein said tensionable receiver tube supporters comprise chains.

9. An extended trailer hitch receiver tube support apparatus as described in claim 1 wherein said vertical member is established substantially behind a license plate connection site of said vehicle.

10. An extended trailer hitch receiver tube support apparatus as described in claim 1 wherein said tensionable vertical member supporters comprise metal straps.

11. An extended trailer hitch receiver tube support apparatus as described in claim 1 wherein said tensionable vertical member supporters comprise chains.

12. An extended trailer hitch receiver tube support apparatus as described in claim 1 wherein said tensionable receiver tube supporters connect to said extended hitch receiver tube via a quick connector.

13. An extended trailer hitch receiver tube support apparatus as described in claim 1 wherein said frame attached, extended hitch tube receiver support comprises only one cross member.

14. An extended trailer hitch receiver tube support apparatus as described in claim 1 wherein said vertical member comprises a top connecting member to which an end of each of said tensionable receiver tube supporters is connected.

15. An extended trailer hitch receiver tube support apparatus as described in claim 1 wherein said apparatus is fully detachable from said vehicle frame.

16. An extended trailer hitch receiver tube support method, comprising:
    attaching an extended hitch tube receiver support to a vehicle frame, said vehicle frame defining a longitudinal, vehicle frame centerline, said extended hitch tube receiver support comprising a hitch receiver support cross member that traverses substantially along a width of said vehicle and transversely to said longitudinal, vehicle frame centerline;
    connecting a hitch tube receiver with said hitch receiver support cross member,
    operatively engaging an extended hitch receiver tube having a front end and rear end with said hitch tube receiver at said front end;
    connecting a vertical member with said hitch receiver support cross member such that at least a portion of said vertical member is above said hitch tube receiver;
    establishing a triangulating support lattice by connecting tensionable receiver tube supporters to said vertical member and said extended hitch receiver tube at a site other than said front end of said extended hitch receiver tube,
said method further comprising the steps of:
    connecting tensionable vertical member supporters to said vertical member and to an apparatus tie-in site, said apparatus tie-in site comprising a site selected from the group consisting of: said vehicle frame, and said frame attached, extended hitch tube receiver support.

17. An extended trailer hitch receiver tube support method as described in claim 16 wherein said tensionable vertical member supporters extend diagonally forward from said vertical member.

18. An extended trailer hitch receiver tube support method as described in claim 16 wherein said tensionable vertical member supporters extend diagonally forward from said vertical member.

19. An extended trailer hitch receiver tube support method as described in claim 16 wherein said tensionable receiver tube supporters extend diagonally forward from said site at which said tensionable receiver tube supporters connect with said extended hitch receiver tube.

20. An extended trailer hitch receiver tube support method as described in claim 16 wherein said tensionable receiver tube supporters extend upwards from said site at which said tensionable receiver tube supporters connect with said extended hitch receiver tube.

21. An extended trailer hitch receiver tube support method as described in claim 16 wherein said apparatus tie-in is said vehicle frame.

22. An extended trailer hitch receiver tube support method as described in claim 16 wherein said apparatus tie-in is said frame attached, extended hitch tube receiver support.

23. An extended trailer hitch receiver tube support method as described in claim 16 wherein said tensionable receiver tube supporters comprise turnbuckles.

24. An extended trailer hitch receiver tube support method as described in claim 16 wherein said tensionable receiver tube supporters comprise chains.

25. An extended trailer hitch receiver tube support method as described in claim 16 wherein said vertical member is established substantially behind a license plate connection site of said vehicle.

26. An extended trailer hitch receiver tube support method as described in claim 16 wherein said tensionable vertical member supporters comprise metal straps.

27. An extended trailer hitch receiver tube support method as described in claim 16 wherein said tensionable vertical member supporters comprise chains.

28. An extended trailer hitch receiver tube support method as described in claim 16 wherein said tensionable receiver tube supporters connect to said extended hitch receiver tube via a quick connector.

* * * * *